May 21, 1929. V. L. SHONKA 1,714,322
GRAIN SAVER
Filed Jan. 9, 1928
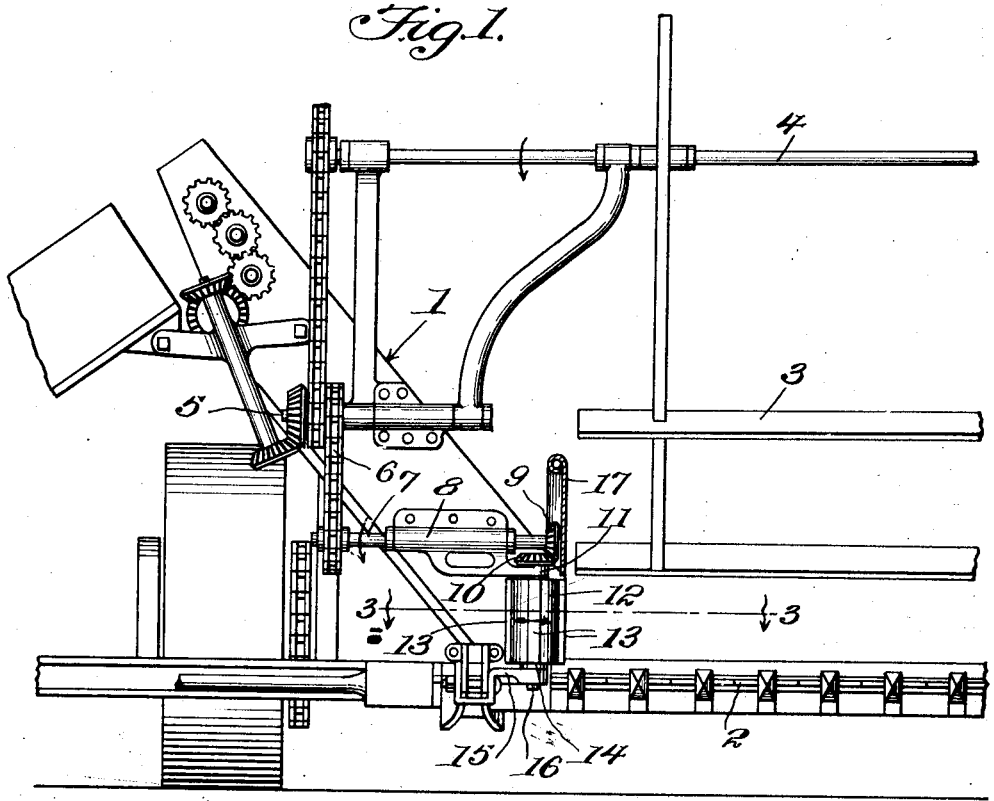
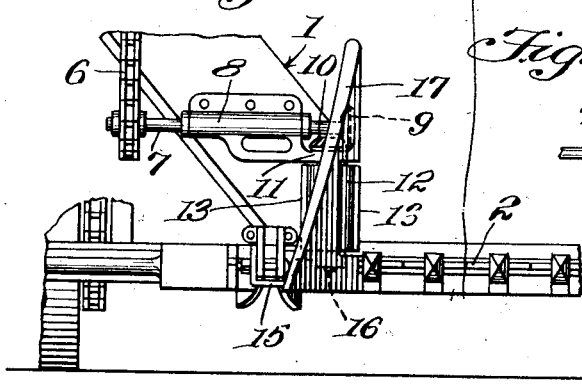
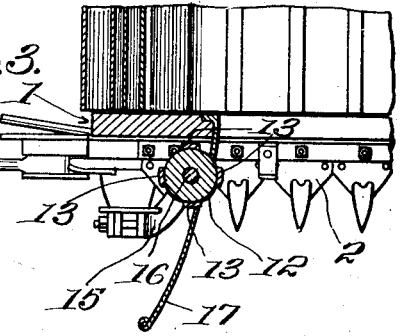
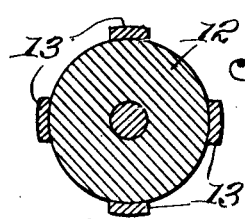
Valerian L. Shonka
INVENTOR
BY Victor J. Evans
ATTORNEY
WITNESS:

Patented May 21, 1929.

1,714,322

UNITED STATES PATENT OFFICE.

VALERIAN L. SHONKA, OF BELLWOOD, NEBRASKA.

GRAIN SAVER.

Application filed January 9, 1928. Serial No. 245,480.

My present invention has reference to an attachment for harvesting machines, the object being the provision of simple means which will result in a saving of grain and the making of better bundles.

A further object is to arrange directly above the upper reciprocatory cutter at the grain guard of a harvesting machine a roller journaled in a manner whereby the same will be rotated by the operation of the machine, and which roller will prevent the bunching of the straw and grain at the grain guard and properly direct the same onto the platform and thereby result in a saving of grain and permitting of better bundles of straw being made by the machine.

To the attainment of the foregoing and other objects which will present themselves as the nature of the invention is better understood, the improvement consists in the construction, combination and operative association of parts, one satisfactory embodiment of which is disclosed by the accompanying drawings.

In the drawings:

Figure 1 is a fragmentary elevation of a grain binder, illustrating the application of my improvement thereon, the grain guard being in section.

Figure 2 is a fragmentary elevation of a binder to more clearly illustrate the arrangement of my improvement with respect to the knives and to the grain guard of the machine.

Figure 3 is a sectional view approximately on the line 3—3 of Figure 1.

Figure 4 is a transverse sectional view through the roller.

In the drawings, the numeral 1 broadly indicates a sufficient portion of a grain harvesting machine to illustrate the application of my improvement thereon. The machine is provided with the usual stationary and reciprocatory cutters, and the upper and reciprocatory cutters are indicated for distinction by the numeral 2. Above the cutters there is located the usual reel 3 that is fixed on a shaft 4 journaled in the usual bearings. The shaft is turned by the sprocket chain that is trained around a sprocket wheel fixed on a beveled gear which is revolved in the usual manner. For distinction, the shaft for the last mentioned beveled gear and sprocket chain is indicated by the numeral 5 and this shaft carries an additional sprocket wheel around which is trained a second sprocket chain 6. The chain 6 is also trained around a sprocket wheel that is fixed on one end of a shaft 7 and this shaft is journaled through a suitable bearing box 8 that is suitably fixed on the elevator of the machine. The second end of the shaft 7 carries a fixed beveled gear 9 which is in mesh with a similar gear 10 whose shaft is journaled through a projecting arm 11 on the bearing box 8. Fixed on this shaft there is the roller member 12 of the improvment. The roller, as disclosed by the drawings, has peripheral ribs 13. The bottom of the roller is located directly above one of the upper end knives 2 and the said lower end of the roller has a thrust bearing or washer 14 that rests upon the lower bearing 15 for the shaft 16 that carries the gear 10 and on which the roller is fixed.

The grain guard is indicated by the numeral 17 and a portion of this guard is cutaway or slotted so that one of the ribs of the roller is free to travel through said slot and the outer face of this rib is arranged approximately in a line with the outer face of the grain guard or the face thereof next to the cutters.

Manifestly the roller will be rotated by operation of the machine. The roller prevents the bunching of straw against the grain guard and likewise forces the straw contacted thereby onto the platform of the harvester, so that the straw will be evenly delivered to the elevator and grain which otherwise drops from the heads of the straw and is consequently lost will be saved.

Having described the invention, I claim:

The combination with a grain harvesting machine, including the usual cutters, the grain guard, the reel, platform and elevator, together with means for operating the elevator and rotating the reel, and wherein the grain guard has an opening therethrough, of a shaft rotated by the turning of the reel, a bearing for the shaft having an arm extension, a vertically disposed shaft journaled through said arm extension, intermeshing gears on this shaft and on the first mentioned shaft, a ribbed roller fixed on the last mentioned shaft and one of the ribs of the shaft being normally arranged in the opening in the grain guard, a bearing for the lower end of the last mentioned shaft, and spacer means between the roller and the last mentioned bearing for arranging the bottom of the roller directly above the upper knives of the harvester.

In testimony whereof I affix my signature.

VALERIAN L. SHONKA.